United States Patent
Matolin

(10) Patent No.: US 8,435,921 B2
(45) Date of Patent: May 7, 2013

(54) METHOD FOR PREPARING OXIDATION CATALYST AND CATALYSTS PREPARED BY THE METHOD

(75) Inventor: Vladimir Matolin, Zdiby (CZ)

(73) Assignee: Univerzita Karlova V Praze, Praha (CZ)

( * ) Notice: Subject to any disclaimer, the term of this patent is extended or adjusted under 35 U.S.C. 154(b) by 127 days.

(21) Appl. No.: 13/123,763

(22) PCT Filed: Oct. 16, 2009

(86) PCT No.: PCT/CZ2009/000122
§ 371 (c)(1), (2), (4) Date: Apr. 12, 2011

(87) PCT Pub. No.: WO2010/043189
PCT Pub. Date: Apr. 22, 2010

(65) Prior Publication Data
US 2011/0257004 A1    Oct. 20, 2011

(30) Foreign Application Priority Data
Oct. 17, 2008 (CZ) .................... PV2008-630

(51) Int. Cl.
*B01J 23/00* (2006.01)
*B01J 23/10* (2006.01)
*B01J 23/42* (2006.01)
*B01J 23/44* (2006.01)
*B01J 23/02* (2006.01)
*B01J 23/04* (2006.01)

(52) U.S. Cl.
USPC ............ 502/304; 502/339; 502/344; 977/700

(58) Field of Classification Search .................. 502/304, 502/339, 344; 977/700, 775, 776, 773, 810, 977/811
See application file for complete search history.

(56) References Cited

U.S. PATENT DOCUMENTS

| | | | |
|---|---|---|---|
| 5,892,254 A | 4/1999 | Park et al. | |
| 2003/0004054 A1 | 1/2003 | Ito et al. | |
| 2007/0190347 A1* | 8/2007 | Fajardie et al. | 428/469 |
| 2007/0225159 A1* | 9/2007 | Ibe et al. | 502/304 |

FOREIGN PATENT DOCUMENTS

EP    1 724 012 A1    11/2006

OTHER PUBLICATIONS

Fu et al., "Active Nonmetallic Au and Pt Species on Ceria-Based Water-Gas Shift Catalyst", Science 301, 935-, Aug. 15, 2003.*
Mašek, Karel et al., "Sn-CeO2 thin films prepared by rf magnetron sputtering: XPS and SIMS study", Applied Surface Science, 2009, pp. 6656-6660, vol. 255.
Shelef, M. et al., "An XPS Study of Interactions in Thin Films Containing a Noble Metal with Valence-Invariant and Reducible Oxides", Journal of Catalysis, 1992, pp. 114-126, vol. 137.
Matolín, V. et al., "Pt and Sn Doped Sputtered CeO2 Electrodes for Fuel Cell Applications", Fuel Cells, 2010, pp. 139-144, vol. 10, No. 1.
Škoda, M. et al., "Sn Interaction with the CeO2(1 1 1) system: Bimetallic bonding and ceria reduction", Applied Surface Science, 2008, pp. 4375-4379, vol. 254.
International Search Report for International Application No. PCT/CZ2009/000122, with a mailing date of Sep. 23, 2010, four (4) pages.

* cited by examiner

*Primary Examiner* — Anthony J Zimmer
(74) *Attorney, Agent, or Firm* — Nath, Goldberg & Meyer; Tanya E. Harkins

(57) ABSTRACT

A method for preparing oxidation catalyst comprising cerium oxide and a metal selected from the group consisting of gold, platinum palladium, tin, ruthenium, or nickel by sputtering cerium oxide and a metal from a target to a substrate wherein the cerium oxide and a metal material are sputtered to the substrate concurrently from at least one target under an argon atmosphere to form a layer of cerium oxide including dispersed atoms of the metal Specific Au—$CeO_2$ and Pt—$CeO_2$ catalysts are prepared by using this method.

4 Claims, 6 Drawing Sheets

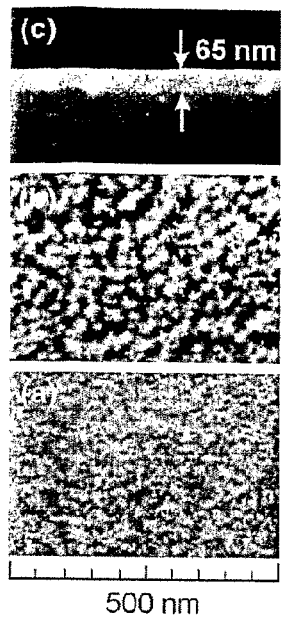
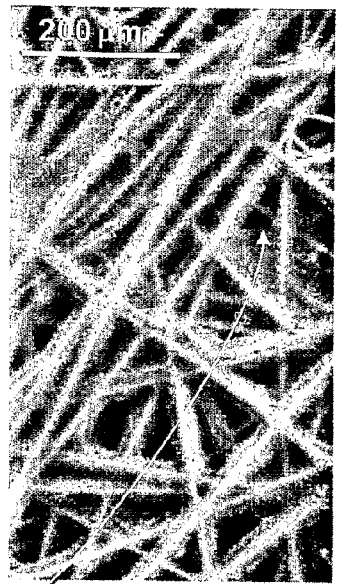
Fig. 4a, 4b, 4c
Fig. 5
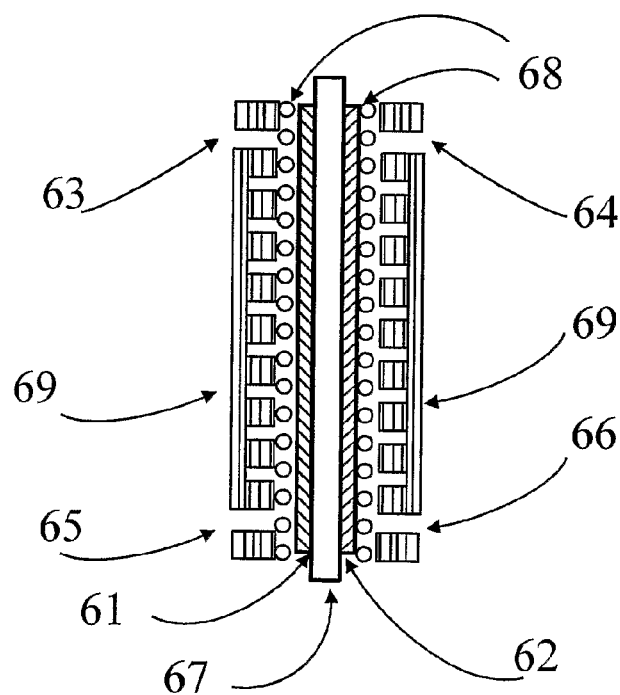
Fig. 6

METHOD FOR PREPARING OXIDATION CATALYST AND CATALYSTS PREPARED BY THE METHOD

This is a National Phase Application filed under 35 U.S.C. §371 as a national stage of PCT/CZ2009/000122, filed on Oct. 16, 2009, an application claiming the benefit under 35 U.S.C. §119 of Czech Patent Application No. PV2008-630, filed on Oct. 17, 2008, the content of each of which is hereby incorporated by reference in its entirety.

TECHNICAL FIELD

The invention relates to a method for preparing an oxidation catalyst comprising cerium oxide and a metal selected from the group consisting of gold, platinum palladium, tin, ruthenium, or nickel by sputtering cerium oxide and metal from a target to a substrate, Further, the invention relates to catalysts prepared by the same method.

BACKGROUND ART

Oxidation catalysts based on a combination of cerium dioxide, $CeO_2$, and metal have been reported in both non-patent and patent literature.

The work of Fu et al., published in Science (2003), describes catalytic activity of a $CeO_2$—Au catalyst for the reaction of water with carbon monoxide, yielding carbon dioxide and hydrogen as reaction products. This is a key reaction for the production of hydrogen by hydrocarbon reforming and for the oxidation of methanol and ethanol in the direct methanol fuel cells (DMFC). In this work a $CeO_2$—Au catalytic system in the form of a powder prepared by the traditional techniques of co-precipitation and diffusion of gold into the surface of $CeO_2$ was used.

EP1724012A1 patent application describes a catalyst based on gold deposited on crystalline $CeO_2$, with an average primary grain size of 5-20 nm, as well as aggregates of such crystallites 20-100 nm in size.

EP1920831A2 patent application describes a catalyst for the oxidation of solid particles in diesel engine exhaust gas, based on a combination of a mixture of two metal oxides, with Ce as one metal and Ga, Mn, Fe, Co, Ni, Cu, Yt, Zr, Mo, Ag, La, Pr, Nd, or Au as another. Catalytic material with the desired composition was prepared by precipitation from liquid solutions.

Several other patent applications deal with oxidation catalysts utilizing a combination of $CeO_2$ with another metal: EP1676625A1, EP1683574A1, EP1787719A2, EP1889651A1, EP1852181A1, and WO2005/100249A1. In these applications, catalysts are produced by traditional procedures, e.g. by precipitation from solutions.

Some catalytic materials are prepared by sputtering. In this technique, a thin layer is deposited onto a substrate from a stream of particles (atoms, molecules) scattered from a target by energetic ions, usually argon. The work of W. D. Westwood, published in Sputter Deposition, AVS Education Committee Book Series, Vol. 2 (2003) ISBN 0-7354-0105-5, describes a whole range of sputtering techniques. In most cases, a device called magnetron is used for sputtering.

The EP0682982A2 patent application describes how an adhesion of a catalytically active metal can be enhanced by deposition of an intermediate layer of a basal metal onto a monolithic oxide substrate. Basal metal is either a metallic element from the rare earth group, or manganese. The catalytically active noble metal (platinum in this case) is deposited on top of this layer.

Amongst the main drawbacks of the catalysts mentioned above is either too low catalytic activity, or too high content of noble metals, mainly gold and platinum. Furthermore, powder catalysts containing $CeO_2$ and a noble metal suffer from too low dispersion of the active metal in $CeO_2$. Other common drawback of the aforementioned catalysts is low resistance against poisoning.

The techniques for preparation of metal-$CeO_2$ catalysts known so far do not allow the production of catalysts active enough to be used in, for instance, oxidation of methanol or ethanol in direct fuel cells.

Excessive use of noble metals leads to the increase of production cost of such a catalyst. Mass production of catalysts with high content of noble metals also burdens the environment.

DISCLOSURE OF INVENTION

The object of the invention is to provide a catalyst exhibiting equal or higher catalytic activity compared to the currently known catalytic materials while requiring substantially lower content of noble metals. Another object of the invention is to provide a highly active catalyst for hydrogen fuel cells featuring high tolerance to the presence of carbon monoxide for example in the industrially produced hydrogen gas which contains traces of CO, the removal of which is otherwise high expensive. Still another object of the invention is to provide a catalyst applicable to the process of generation of hydrogen via reaction of water with carbon monoxide in reforming combustion engines exhaust fumes, and to catalyze a number of other chemical reactions.

The objects of the present invention can be achieved and the described deficiencies overcame by a method for preparing oxidation catalyst comprising cerium oxide and a metal selected from the group consisting of gold, platinum palladium, tin, ruthenium, or nickel by sputtering a cerium oxide and a metal from a target to a substrate, wherein the cerium oxide and a metal material are sputtered to the substrate concurrently from at least one target to form a layer of cerium oxide including dispersed atoms of the metal.

Alternatively the cerium oxide may be concurrently sputtered to the substrate from one target and the metal material from another target. This enables an improved control over the sputtering process in order to obtain a specific required structure and properties of the catalyst.

The described method allows continuous doping of cerium oxide thin layer with metal atoms during its growth on the substrate, dispersion of the metal within the cerium oxide layer at the atomic level, and leads to the presence of the metal in ionic form.

Furthermore, by this method an interaction of the metal atoms with cerium oxide, its high catalytic activity and high resistance against catalytic poisoning is achieved, for instance, high tolerance for the presence of carbon monoxide in hydrogen during reactions inside a fuel cell.

The following description refers to various specific embodiment of gold or platinum/ $CeO_2$ based catalyst, which may be prepared according to the invention.

An Au—$CeO_2$ catalyst in which the gold is dispersed on the surface of the cerium oxide layer in the form of clusters sized from 1 to 20 nm. In this particular embodiment, the surface activity of the catalyst is thus significantly improved.

An Au—$CeO_2$ catalyst comprising gold in the form of $Au^{+1}$ and $Au^{+3}$ cations in an amount of 25 to 99 percent by weight of the total amount of gold in the catalyst. Such catalyst shows an enhanced catalytic activity both on the surface and inside the thin layer of the catalyst. This enhancement is a result of ionic character of gold present in the catalyst.

An Au—$CeO_2$ catalyst comprising gold in the form of $Au^{+1}$ and $Au^{+3}$ cations in an amount of 0.01 to 4 atomic percent by weight of the total amount of atoms in the Au—$CeO_2$ layer. It this case the atomic concentration of $Au^{+1}$ and $Au^{+3}$ cations relative to the total amount of material in the catalyst is maintained below 4 atomic percent while the catalytic activity remains high although the gold consumption during production of the catalyst is substantially reduced.

A Pt—$CeO_2$ catalyst comprising platinum in the form of $Pt^{+2}$ a $Pt^{+4}$ cations in an amount from 30 to 100 percent by weight of the total amount of platinum in the catalyst.

Due to the presence of high concentration of platinum in the ionic form, high selectivity of the catalytic activity for some chemical reactions is achieved, for instance, reactions running in direct hydrogen-fueled proton-exchange fuel cells.

A Pt—$CeO_2$ catalyst comprising platinum in the form of $Pt^{+2}$ a $Pt^{+4}$ cations in an amount of 0.01 to 4 atomic percent by weight of the total amount of atoms in the Pt—$CeO_2$ layer. Like in the case of the above described gold based catalyst the catalytic activity remains high even if the platinum consumption during the production of the catalyst is substantially reduced.

BRIEF DESCRIPTION OF DRAWINGS

The details of the invention are described by means of the following pictures and drawings:

FIG. 4b-is a microscopic image of the surface morphology of an Au—$CeO_2$ catalyst;

FIG. 4c-is a microscopic image showing thickness of an Au—$CeO_2$ catalyst;

FIG. 5-is a microscopic image of the surface morphology of Pt—$CeO_2$ catalyst;.

FIG. 6-is a schematic sectional view of a fuel cell;

MODES FOR CARRYING OUT THE INVENTION

Example 1

Figure 1A:
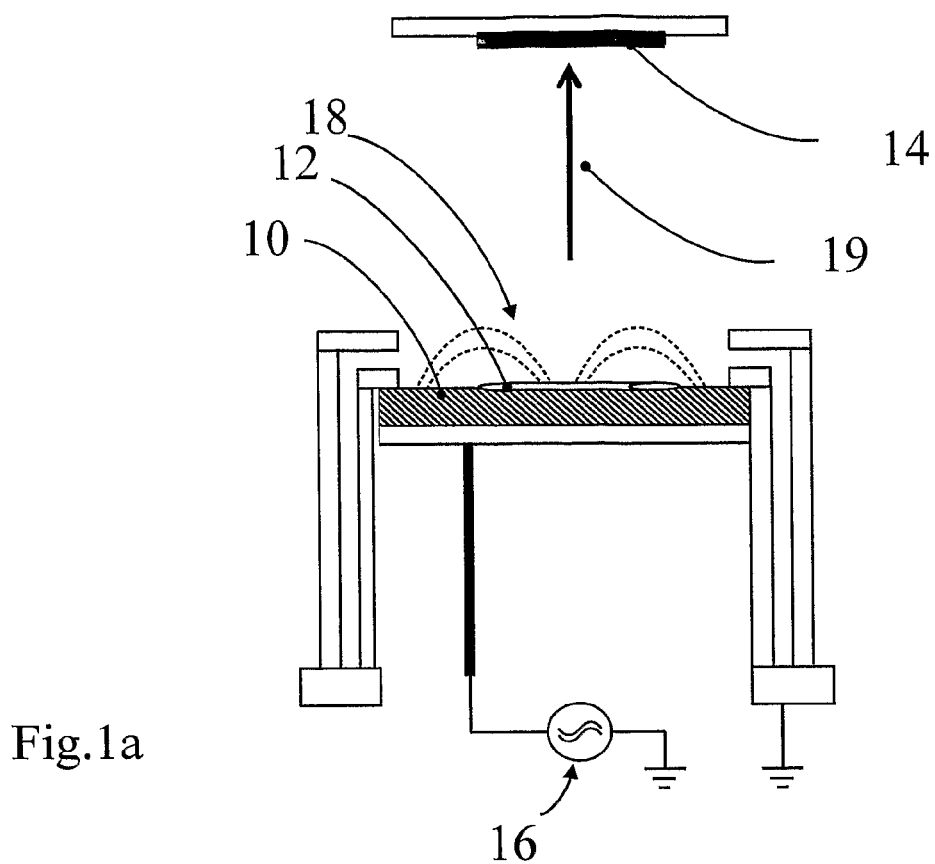
FIG. 1a-is a schematic cross-sectional view of sputtering device /magnetron/ with a single composite target.
Figure 1B:
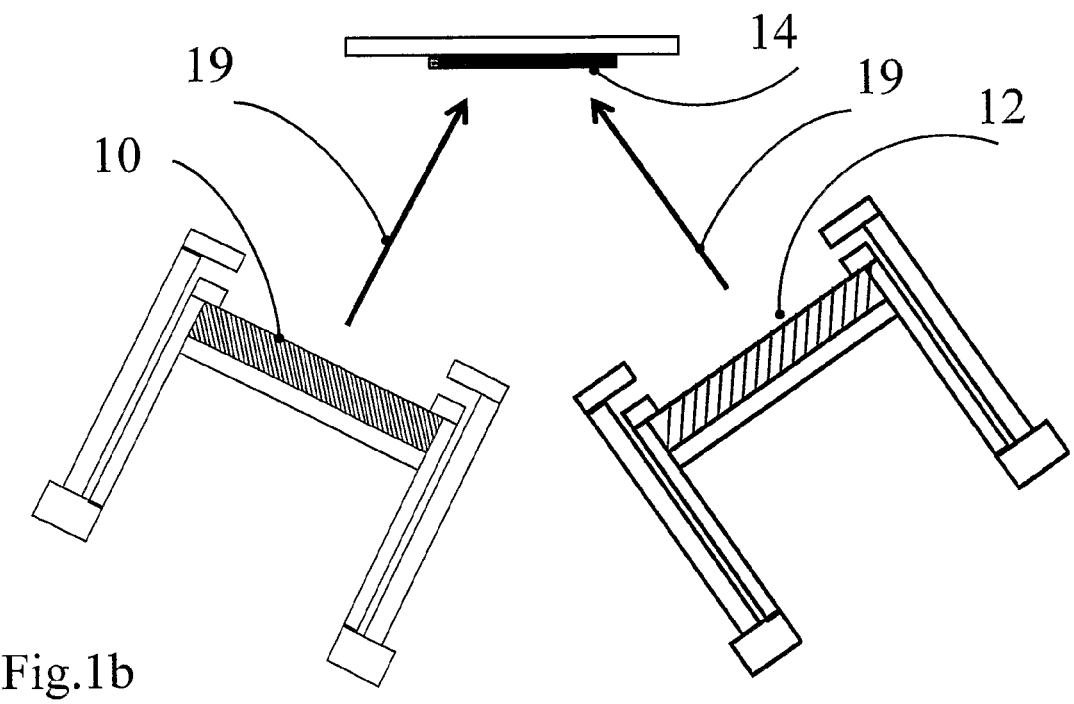
FIG. 1b-is a schematic cross-sectional view of two magnetrons including two single targets.

A sputtering device also called magnetron, as a device for performing a high-frequency sputtering of oxides and metals is shown in a schematic cross-sectional view in FIG. 1a and FIG. 1b.

The magnetron shown in FIG. 1a comprises a so called composite target consisting of a $CeO_2$ plate 10 and a metal material 12 placed on the $CeO_2$ plate 10. The metal material make take a form of a wire and as a metal material any metal from the group of Au, Pt, Pd, Sn, Ru, Ni may be used. Flux 19 of atoms sputtered from the target 10, 12 by argon ions is deposited onto a substrate 14, for example a silicone plate, to gradually form a thin layer of a catalyst. The magnetron is connected to a high-frequency AC power supply 16. Magnetic lines of force are represented by curves 18. The sputtering is conducted under very low argon pressure of 0.6 Pa. During the deposition and growth of the $CeO_2$ thin layer on the substrate 14, the thin layer is continuously doped with atoms of a given metal which are dispersed within the $CeO_2$ layer. If doped with at least one of the aforementioned metallic elements, such thin layer exhibits high catalytic efficiency, which was demonstrated experimentally. FIG. 1b shows an alternative embodiment of the sputtering device comprising two magnetrons with the respective targets. The left magnetron bears the $CeO_2$ plate 10 target and the right magnetron bears the metal material 12 target designed for doping the catalyst $CeO_2$ layer formed on the substrate 14.

Figure 2:
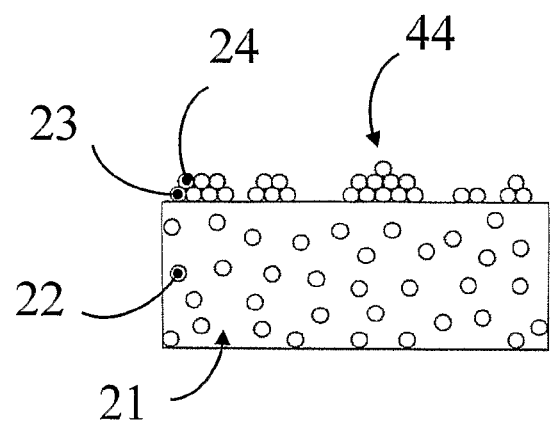
FIG. 2-is a graphical representation of metal atoms within the cerium oxide layer FIG. 3-is another graphical representation of metal atoms within the cerium oxide FIG. 4a-is microscopic image of the surface morphology of a catalyst without a doped gold.
Figure 3:
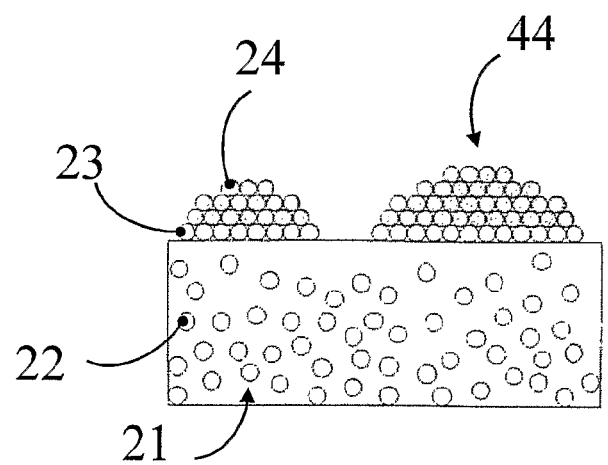

In case of doping with gold, the activity of the catalyst is indicated by the presence of $Au^{+1}$ a $Au^{+3}$ ions which were detected by photoelectron spectroscopy (XPS) measurements. In the currently known catalytic materials no or negligible concentration of cationic gold is present. In FIGS. 2 and 3, a graphical representation of a catalyst thin layer containing gold ions dispersed within the cerium oxide layer according to the invention is shown. Gold atoms 22, 23, 24, or cations, respectively, are dispersed by means of high-frequency sputtering inside the cerium oxide $CeO_2$ layer 21. XPS measurements, hereinafter described in more details, reveal the distribution of gold atoms in metallic and ionic forms. Due to the ability of gold atoms 22 to diffuse within the cerium oxide layer, these atoms tend to segregate on the surface in the form of clusters sized from 1 to 20 nm. These clusters 44 are clearly visible in the microscopic image of the catalyst thin layer in FIG. 4b obtained by means of scanning electron microscopy. On their surface, the gold is present as atoms 24 in the atomic form $Au^0$. Inside the cluster, under the atomic $Au^0$ shell, the ionic gold is present in the form of $Au^{+1}$ cations 23, while dispersed gold within the thin layer of the catalyst is present in the form of $Au^{+3}$ cations 22.

In case of doping with platinum, the activity of the catalyst is indicated by the presence of $Pt^{+2}$ and $Pt^{+4}$ ions which were detected by photoelectron spectroscopy (XPS) measurements. Practically 100% of the platinum is present in the ionic form; the spectroscopic measurements did not prove any presence of metallic platinum $Pt^0$. Since atoms of platinum do not migrate within $CeO_2$ as readily as gold, the formation of platinum clusters is not as substantial as in the case of gold.

Catalytic properties of the catalyst described above were checked by integrating the catalyst into a direct fuel cell. The scheme of a fuel cell with catalyst is depicted in FIG. 6. The basic quantity for the determination of efficiency of a fuel cell catalytic system is specific power output measured in mW per $cm^2$ of anode surface.

The fuel cell with Au—$CeO_2$ catalyst exhibited very high specific power output with methanol as a fuel. If methanol is used as a fuel, the following chemical reaction, catalyzed by the metal-$CeO_2$ catalyst, runs in the fuel cell:

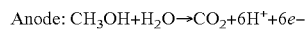
Anode: $CH_3OH+H_2O \rightarrow CO_2+6H^++6e-$

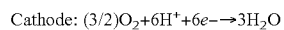
Cathode: $(3/2)O_2+6H^++6e- \rightarrow 3H_2O$

On the contrary the fuel cell with Pt—$CeO_2$ catalyst did not exhibit very high specific power output for methanol but did so when hydrogen was used as a fuel. This is because methanol molecules react with gold atoms 23, 24. $Au^{1+}$ segregated on the surface of the catalyst thin layer—see FIG. 2, When using platinum the migration of metal atoms to the surface is not so substantial. Since large methanol molecules are unable to diffuse into the Pt—$CeO_2$ thin layer of the catalyst the above reaction runs very slowly. Instead with hydrogen as a fuel, the following the following chemical reaction, catalyzed by the metal-$CeO_2$ catalyst, runs in the fuel cell:

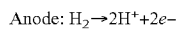
Anode: $H_2 \rightarrow 2H^+ + 2e-$

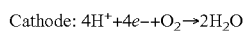
Cathode: $4H^+ + 4e- + O_2 \rightarrow 2H_2O$

The Pt—$CeO_2$ fuel cell with hydrogen fuel exhibits exceptional current characteristics. This is because small hydrogen atoms can readily penetrate the catalyst thin layer where they react in the presence $Pt^{+2}$ a $Pt^{+4}$ ions releasing electrons, as described in the above reaction scheme for anode. Hydrogen atoms are created by dissociation of $H_2$ molecules on the catalyst surface.

The catalyst according to the invention was prepared in the following way: Deposition of $CeO_2$ thin layers and their concurrent doping with a metal (Au, Pt, Pd, Sn, Ru, or Ni) was conducted by means of the non-reactive high-frequency magnetron sputtering technique described above, using a magnetron. The scheme of the magnetron setup is shown in FIG. 1.

Example 2

In this comparative example a pure $CeO_2$ was sputtered, while in the second and the third implementation the deposited layers of $CeO_2$ were doped with gold. The sputtering was carried out from a circular $CeO_2$ plate 10 target with a diameter of 5.08 cm, placed 90 mm apart from the substrate 14 made of silicon, applying power of 80 W to the magnetron. The sputtering was done under argon atmosphere with constant pressure of 0.6 Pa, the substrate was kept at a room temperature. Growth rate of the catalyst thin layer was 1 nm/min. The time of deposition was chosen to obtain the desired thickness of the catalyst thin layer, typically 20-60 minutes. A top view 42 of the $CeO_2$ thin layer (without Au doping) is shown in FIG. 4a.

Example 3

The metal material 12 in the form of a Au wire (1 mm in diameter, 10 mm long), was placed on the $CeO_2$ target in radial direction. In embodiment 1, only a single Au wire was placed on the target. In embodiment 2 two identical Au wires as above were placed on the target. The deposition conditions were exactly the same as in Example 2.

The catalysts comprising $CeO_2$ thin layers doped with gold obtained in the embodiment 1 and 2 were analyzed by different experimental techniques and their catalytic activity in a fuel cell was evaluated.

Surface morphology and thickness of the thin layer of the catalyst was investigated by means of scanning electron microscopy. In FIG. 4, three views on the layers of the catalyst are shown: FIG. 4c shows a cross section view 41 of the catalyst thin layer obtained in the embodiment 2. FIG. 4b shows a top view 42 onto the same thin layer. The thickness of the thin layer in FIG. 4c was measured by scanning electron microscope as 65 nm. Polycrystalline structure of the $CeO_2$ thin layer surface is evident from the top view 42. On the surface of the catalyst, clusters 44 of gold atoms 23, 24 schematically illustrated in FIG. 2 were formed. The formation of gold clusters is driven by the tendency of gold atoms dispersed within the $CeO_2$ layer to migrate towards the surface.

Figure 9:
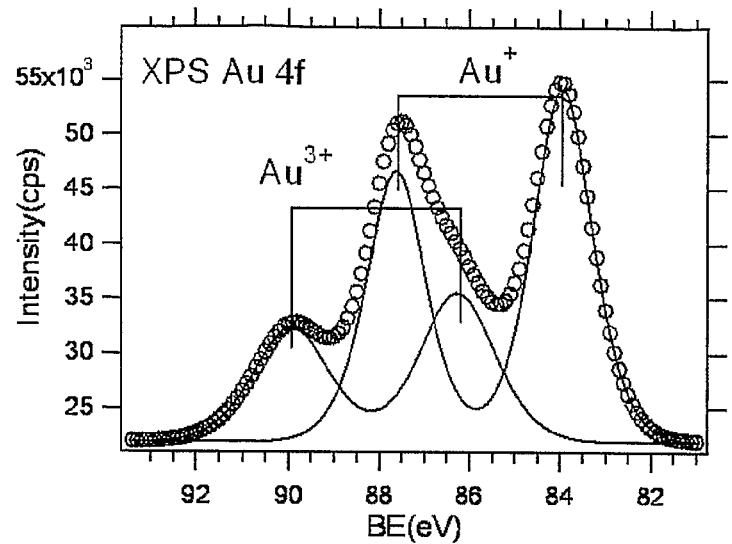
FIG. 9-shows photoelectron spectra (XPS) of the Au—$CeO_2$ catalyst.

Properties of the Au—$CeO_2$ catalyst were investigated by means of photoelectron spectroscopy and its activity was verified in a fuel cell using methanol as a fuel, so-called direct methanol fuel cell. In FIG. 9, a photoelectron spectrum (XPS) of the Au 4f electronic level of the Au—$CeO_2$ catalyst is shown. The spectrum consists of 2 doublets Au $4f_{5/2}$-Au $4f_{7/2}$, representing chemical states of gold $-Au^+$, and $Au^{3+}$.

Example 4

A schematic view of a fuel cell used for measurement of properties of the Au—$CeO_2$ catalyst from Example 3 is depicted in FIG. 6. It is a fuel cell with a commonly used "Nafion" membrane 67 for exchange of protons (proton membrane exchange fuel cell, PEM).

The following components are shown: an anode 61, a cathode 62, a fuel inlet 63, a drain of the excess fuel 64, an oxygen intake 65, and an exhaust 66 for unused oxygen and water vapor. The anode catalyst was deposited onto a microporous GDL (Toray carbon paper, teflonated) in such a way to be in contact with the membrane 67. Voltage and current were measured between plates 69. The Nafion membrane 67 was treated by a standard process involving boiling in hydrogen peroxide, dilute sulphuric acid, and water. The fuel cell cathode 62 was prepared in a standard manner, i.e. Pt powder on carbon substrate, mixed with Nafion solution, was deposited onto a microporous GDL (Toray carbon paper, teflonated). The content of platinum on the layer of catalyst was 5 mg/cm$^2$.

Figure 11:
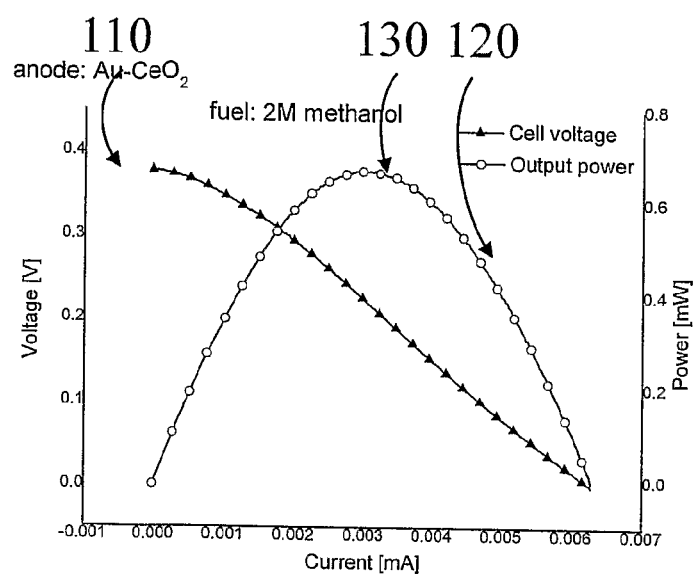
FIG. 11-represents a plot of the specific power output of the fuel cell for the Au—$CeO_2$ catalyst-sample methanol.

Methanol was used as a fuel and supplied to the anode 61 with the flow rate set at 30 ml/min. The cathode 62 was fed with oxygen with the flow rate set at 30 ml/min. The measurement was carried out at temperature of 23 degree Celsius, both fuel and oxygen were supplied at atmospheric pressure. Polarization V-I curves are shown in FIG. 11, where the x-axis of the plot represents voltage, the left y-axis represents current and the right one represents output power of the fuel cell. The voltage curve is labeled as 110, power curve is labeled as 120. Total area of the catalyst in the fuel cell was 1 cm$^2$. Maximal power density 130 gained with this particular catalyst was 0.67 mW/cm$^2$.

Example 5

For Pt—$CeO_2$ material, two different embodiments were accomplished. The sputtering was done by using the same magnetron as in Examples 2 and 3. The sputtering conditions were also identical to those in Examples 2 and 3. In embodiment 3, a single platinum (Pt) metal material 12 in the shape of a wire (0.5 mm diameter, 10 mm long) was placed on the $CeO_2$ plate 10 target in radial direction, see FIG. 1b. In embodiment 4, two identical Pt wires with the above dimensions were placed on the target.

The catalysts comprising $CeO_2$ thin layers doped with platinum obtained in embodiments 3 and 4 were analyzed by means of photoemission spectroscopy and their catalytic activity in a fuel cell was evaluated.

In FIG. 5, the surface of the catalyst obtained in embodiment 4 deposited on the microporous GDL (Toray carbon paper, teflonated) of a fuel cell covered by carbon nano-tubes is shown. The image was acquired by scanning electron microscope.

Figure 10:
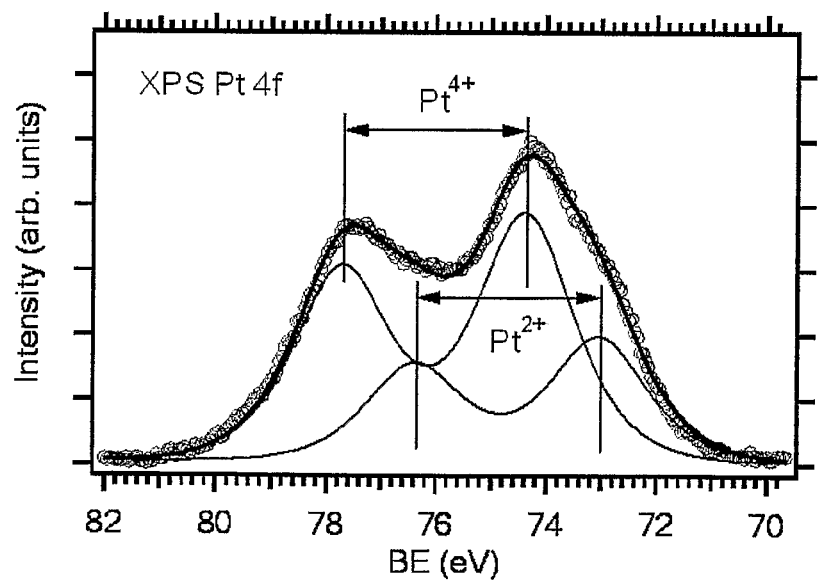
FIG. 10-shows photoelectron spectra (XPS) of the Pt—$CeO_2$ catalyst;.

In FIG. 10, a photoelectron spectrum (XPS) of the Pt—CeO$_2$ catalyst is shown. It can be seen from the spectra analysis, that the platinum atoms are present in ionic forms Pt$^{+2}$ and Pt$^{+4}$.

The properties of the catalyst from embodiments 3 and 4 employed in a fuel cell were as follows. Similarly to the Examples 2 and 3 a fuel cell with membrane for exchange of protons was used, see FIG. 6. In this case, however, hydrogen was used as a fuel supplied to the anode 61, with flow rate set at 30.0 ml/min. Flow rate of oxygen supplied to the cathode 62 was set at 30.0 ml/min.

Figure 8:
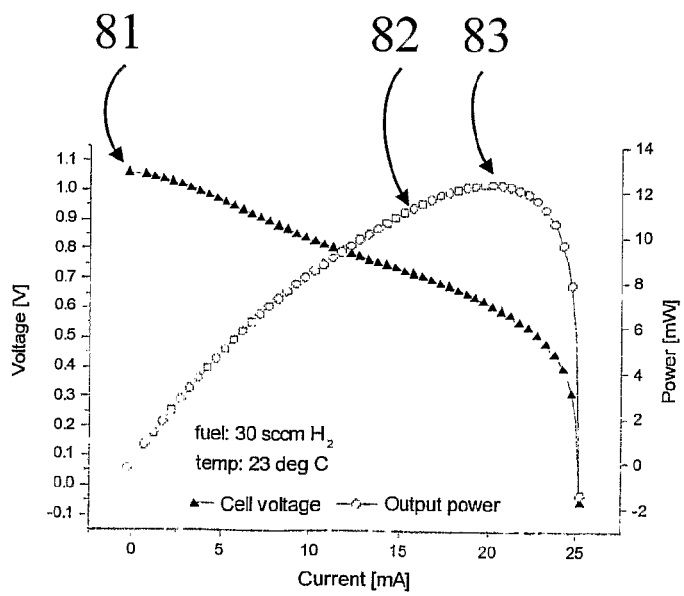
FIG. 8-represents a plot of the specific power output of the fuel cell for the Pt—$CeO_2$ catalyst, sample. H.

Polarization V-I curves (described above) for Pt—CeO$_2$ obtained in the embodiment 4 are plotted in FIG. 8. Total area of the catalyst in the fuel cell was 1 cm$^2$. The output voltage curve is labeled as 81, output power curve is labeled as 82. Maximal power density gained with the catalyst from the implementation 5 was 12.3 mW/cm$^2$ 83. The content of platinum on the catalyst was approximately $2.5 \times 10^{-4}$ mg/cm$^2$. This value was calculated from thickness of the Pt—CeO$_2$ layer and its density. Based on the above values, maximal output power per weight of platinum was determined as 70 W/mg(Pt).

Example 6

Figure 7:
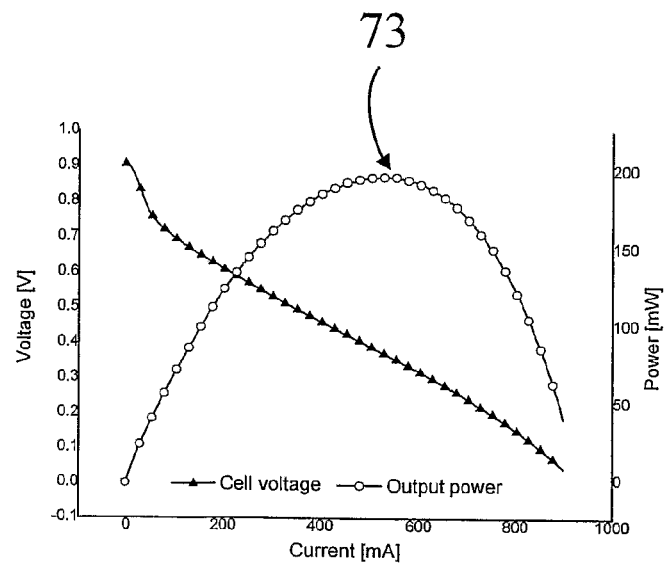
FIG. 7-represents a plot of the specific power output of the fuel cell for the Pt/Ru reference catalyst.

Measurement of reference values—embodiment 5. In order to obtain reference values embodiment 5 was performed on the fuel cell described above with commercially available catalysts, PtRu (50 %Pt, 50 %Ru) on the anode and Pt/C on the cathode, identical to the one used in the previous embodiments. Activity of the catalyst was evaluated under the conditions identical to those in the implementation example 5. Polarization V-I curves for the PtRu reference catalyst from the experiment 6 are plotted in FIG. 7. Maximal power density 73 gained with this catalyst was 196 mW/cm$^2$. Maximal output power per weight of platinum in the catalyst was determined as 39.2 mW/mg(Pt/Ru). This is a typical literature value for fuel cells with proton exchange membrane using standard PtRu (anode) and Pt/C (cathode) catalysts. In this way, correct standard functionality of the fuel cell was verified.

Examples 2 to 5 of the invention demonstrated high catalytic activity of the materials based on metal-CeO$_2$ thin layers prepared by the methods described above. By using the new Pt—CeO$_2$ catalyst, specific output power of a fuel cell, related to 1 mg of Pt, is enhanced by approximately 3 orders of magnitude compared to standard catalysts. In the case of hydrogen-fuelled fuel cells, high tolerance of the presented catalyst to carbon monoxide content in hydrogen is expected.

Industrial Applicability

The method and catalyst according to the invention may be primarily used in fuel cells, for production of hydrogen via reaction of water with carbon monoxide, for reforming exhaust of combustion engines, and for catalysis of other chemical reactions comprising a thin layer of cerium oxide and at least one metal of the group gold, platinum, Pd, Sn, Ni, Ru.

The invention claimed is:

1. An oxidation catalyst comprising a layer including cerium oxide and a metal selected from the group consisting of gold and platinum prepared by a method comprising step of:
    forming a layer of cerium oxide by sputtering the cerium oxide from a target to a substrate using a non-reactive high-frequency magnetron technique and simultaneously and continuously doping this layer by sputtering from the same or another target by atoms of the metal until the content of metal cations amounts to 0.01 to 4 atomic percent by weight of the total amount of atoms in the layer.

2. The oxidation catalyst according to claim 1, comprising gold in the form of Au$^{+1}$ and Au$^{+3}$ cations in an amount of 25 to 99 percent by weight of the total amount of gold in the catalyst.

3. The oxidation catalyst according to claim 1, comprising platinum in the form of Pt$^{+2}$ a Pt$^{+4}$ cations in an amount from 30 to 100 percent by weight of the total amount of platinum in the catalyst.

4. The oxidation catalyst according to claim 2, wherein gold is dispersed on the surface of the cerium oxide layer in the form of clusters sized from 1 to 20 nm.

* * * * *